United States Patent [19]

Miller

[11] Patent Number: 4,468,123
[45] Date of Patent: Aug. 28, 1984

[54] METHOD AND APPARATUS FOR ASCERTAINING COLOR BALANCE OF PHOTOGRAPHIC PRINTING PAPER

[76] Inventor: Bertram W. Miller, Apartado Postal 316, Chapala, Jalisco 45900, Mexico

[21] Appl. No.: 382,254

[22] Filed: May 26, 1982

[51] Int. Cl.$^3$ .......................... G01J 3/46; G03B 27/04
[52] U.S. Cl. ..................................... 356/404; 355/35; 355/72; 355/77
[58] Field of Search ................... 356/404; 355/32, 35, 355/72, 77

[56] References Cited

U.S. PATENT DOCUMENTS 3,901,598  8/1975  Vanheerentals ..................... 355/71
4,166,701  9/1979  Miller ................................. 356/404

Primary Examiner—F. L. Evans

[57] ABSTRACT

The color balance of photographic printing paper is determined by making three successive exposures of the same portion of a sample sheet of photographic color printing paper. Two of the exposures are made through a neutral-color optical wedge of linear density gradient. The third exposure is not made through the wedge. Each exposure consists essentially of a different primary color of light of predetermined intensity and duration selectively to stimulate each of the three color-sensitive emulsion layers in the printing paper. The composite image produced upon development provides a means for visually matching a known color standard such as a neutral gray card to a definite small area of the print produced. The position of the discovered matching area of the print relative to a central point of the composite print, such central point being automatically demarcated in the procedure, provides a direct correction to the trial color analyzer printing program to produce a fully corrected printing program. An easel is provided for positioning the sample sheet of printing paper in proper relationship to the optical wedge, which can be keyed into place in an aperture in the light-proof cover. The wedge is removable and, when in place, may be revolved 90° about the axis vertical to its plane at its density midpoint. Rotation is controlled by fixed stops.

12 Claims, 5 Drawing Figures

METHOD AND APPARATUS FOR ASCERTAINING COLOR BALANCE OF PHOTOGRAPHIC PRINTING PAPER

BACKGROUND OF THE INVENTION

The present invention pertains to color-balancing of photographic printing paper.

Although the present invention has application in various photographic processes, it is particularly useful with processes wherein a positive print is produced from a positive color transparency, using materials known as integral tripacks which have three superimposed light-sensitive emulsion layers. Those skilled in the art will appreciate that it is rarely, if ever, possible to produce a print with accurate color rendition without adjusting for color balance variations which are caused by color-mix changes in lighting conditions and changes in the characteristics of films and printing papers. Positive to positive processes provide substantial latitude in making color correction in printing the transparency by selective variation of red, green, and blue-light exposures.

There are two principal techniques for making such exposure variations in present use. In tricolor additive printing, three separate exposures of the transparency to the printing paper are made respectively through red, green, and blue separation filters, and the three exposures are varied to control color correction. Thus, the printing paper is exposed to varying amounts of red, green, and blue light (hereinafter referred to as the primary colors of light). In white-light subtractive printing, a single exposure of the positive to the printing paper is made through a combination of colored filters, wherein filter densities and colors are varied to control color correction, thereby selectively filtering out varying amounts of the primary colors of light.

In either case, color control is achieved by selectively varying the exposure of the primary colors of light to the printing paper, the exposure being basically the product of light intensity and duration. Such color light variations produce corresponding variations in the production of appropriately colored dyes by the three emulsion layers, red producing red, green producing green, and blue producing blue.

Most prior art color balancing techniques employ visual color judgments, using test prints. Such tests may be of typical subjects, in which case, in the white-light subtractive technique, the use of color filters for viewing a test print to make a subjective judgment as to filtering changes for making subsequent prints is in widespread use. Another technique is to use a matrix of cyan, magenta, and yellow dyes in steps equivalent to some multiple of "color-correcting" units (i.e. 5 cc or 10 cc) to produce a trial or test print by printing through the matrix and then making a visual judgment of the processed print relative to some standard such as a standard gray card. This latter technique suffers from two major defects. First, there is no precise correlation between the indicated degree of correction and the units of color correction found in enlarger colorheads of varying manufacture, to which must be added the crudity of the indicated corrections since 5 cc units is a very coarse measure of correction. The second and most incapacitating defect is that it is virtually impossible to test for three independent variables (red, green, and blue) on a two-dimensional medium.

Less subjective techniques involving the use of color analyzers to detect changes in color balance from negative to negative, or positive to positive, have been in use. Proper use of such techniques requires information as to the color balance of the printing paper being used. Due to changes in storage conditions and age, no two boxes of color printing paper have precisely the same color balance. This impediment has been removed completely by U.S. Pat. Nos. 4,166,701 and 4,257,702 so far as color printing from color negatives to color positive prints is concerned. Because of certain difficulties presented by the design of color analyzers, it is neither convenient nor possible to extend the techniques described in the afementioned patents to the control of color balance of the available materials when printing by positive to positive one-step processes. Some other means of equal accuracy for adjusting the printing to the varying color balance of different lots and different boxes of positive to positive printing paper had to be found.

The eye, quite correctly, has been described as the most discriminating instrument for detecting color differences when two samples are presented to it side by side. Sadly, it lacks the equally important capacity for precisely judging just how much difference there is between side by side samples. Some other technique has to be sought by which color differences may be quantitated. The most simple and accurate technique in color printing by which difference may be measured is the precise measurement of the exposure difference which produces a definite color change. The present invention combines the color comparing faculty of the eye with the precision of photosensitometry to control the color balance of positive to positive color printing so that the results rival those obtained by use of the techniques of the named patents when printing negative to positive color. The present invention, also, circumvents the difficulty posed by three variables in a two dimensional system by holding one color (for example, red) constant while varying the other two continuously against each other and against the fixed color, thus completely doing away with a basic fault of existing matrix-dye systems of color balancing. What results is an X-Y axis system of color balance, which in certain applications can give color analyzer program corrections as fine as 0.0025 log exposure units.

SUMMARY OF THE INVENTION

In accordance with the present invention, the color balance of color photographic printing paper of the type having superimposed emulsion layers is ascertained by forming a composite image on a sample sheet of printing paper, each image composing part of the composite being representative of the responsiveness of the emulsion layers to red, green, and blue light. Each image is formed using a predetermined exposure, uniform in the case of the red exposure, and a linearly varying log exposure in the case of the green and blue exposures. The linearly varying log exposures for green and blue light vary at right angles to each other. An optical wedge produces the linearly varying log exposures for green and blue light and includes an opaque narrow line through its points of equal density at the midpoint of its density range, considering a wedge having a range from 0 to 0.80 density units, the line would be disposed perpendicular to the density axis of the wedge at the 0.40 density point. The crossed images of this line in the sample print define the X and Y axes from which the required color analyzer corrections may be measured. A specially constructed easel is disclosed which has an optical wedge rotatable through an arc of 90° C. to facilitate exposure of the printing paper under darkroom conditons to form test images.

BRIEF DESCRIPTION OF THE DRAWINGS

The novel features believed characteristic of the invention are set forth in the appended claims. The invention itself, however, as well as a preferred mode of use, further objects and advantages thereof, will be best understood by reference to the following detailed description of an illustrative embodiment when read in conjunction with the accompanying drawings wherein:

DETAILED DESCRIPTION OF A PREFERRED EMBODIMENT

Figure 1:
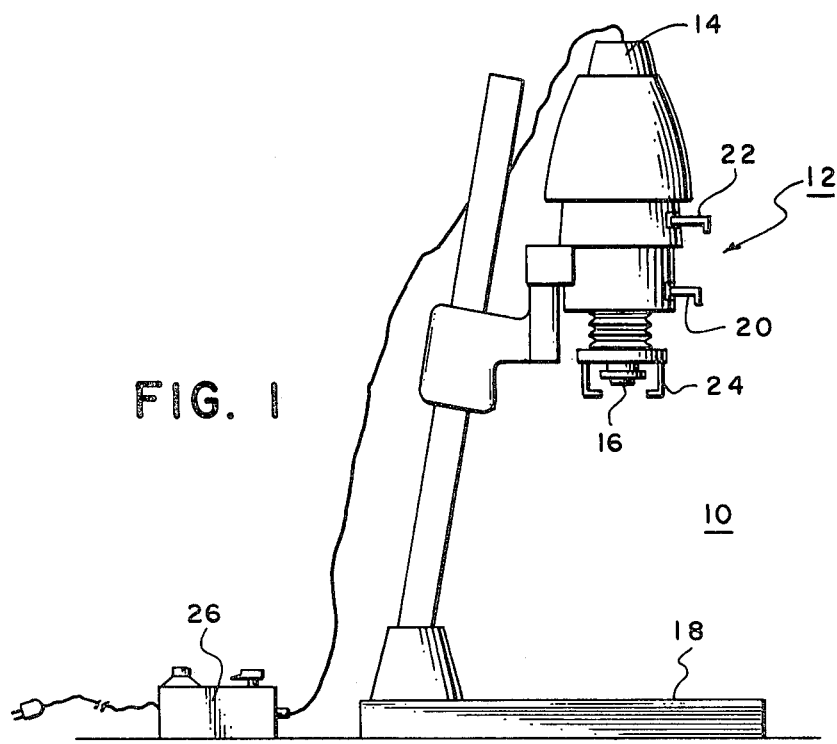
FIG. 1 is a vertical elevation of a photographic enlarger for use with the present invention.
Figure 2:
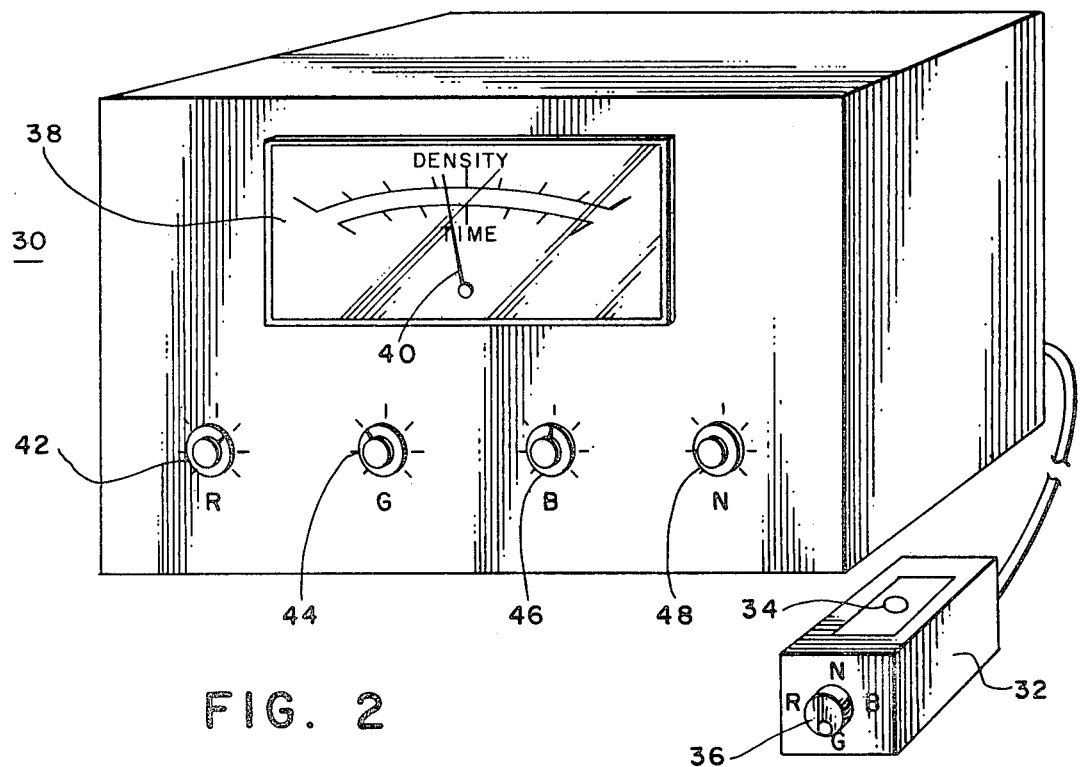
FIG. 2 is a view in perspective of a color analyzer for use with the present invention.

FIGS. 1 and 2 illustrate known pieces of equipment, which may be used in practicing the present invention.

FIG. 1 illustrates a general purpose photographic enlarger 10 having a head 12 which is equipped with a lamp 14 for producing light through a lens 16 at selected heights above the baseboard 18. A negative carrier 20 is disposed in the head 12 between the lamp 14 and lens 16. The head 12 is provided with a drawer 22 for inserting filters in the light path above the negative. In addition, a holder 24 is provided for inserting filters beneath the lens 16. The voltage of the lamp 14 is preferably controlled by a device 26, the significance of which is discussed below.

FIG. 2 illustrates a color analyzer 30, also known as an easel-reading transmission-type densitometer, a variety of which are presently marketed. The color analyzer 30 is equipped with a probe having an aperture 34 through which the light to be analyzed passes. The color of the light to be analyzed, whether red, green, or blue, or neutral, is selected by means of a color-channel control knob 36. A meter 38 having a needle 40 and density and time of exposure scales is provided for controlling light intensity and exposure time as described below. The color analyzer 30 is provided with four attenuator controls, 42, 44, 46, and 48, one for each of the four color channels, which may be used to give quantitative readings of optical density as determined by their settings.

Figure 3:
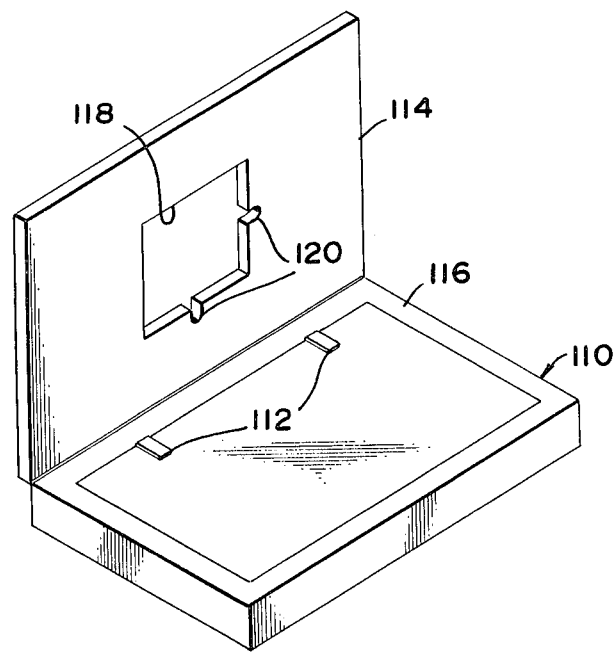
FIG. 3 is a view in perspective of an easel constructed in accordance with the present invention.

FIG. 3 illustrates a specially equipped easel, generally indicated by reference numeral 110, for preparing a specimen of color printing paper for analysis. Clips 112 are preferably provided for securing the printing paper to the platen in the interior of the easel. A light-proof cover 114 is hinged to one edge of the frame 116. The cover has a square opening 118 with identical keyways 120 on two adjacent sides.

Figure 4:
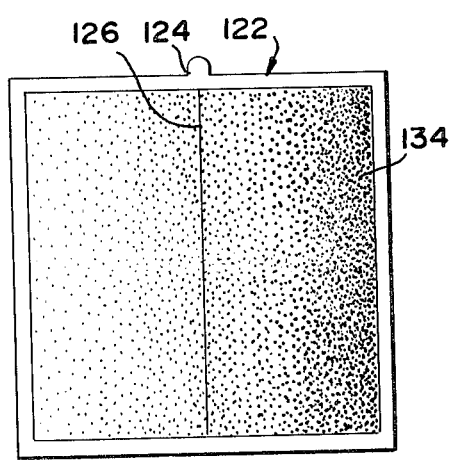
FIG. 4 is a front view of the optical wedge in its mounting.

FIG. 4 illustrates an assembly 122 which fits precisely into the opening 118 of the cover 114, the asembly 122 is provided with a key 124 matching the keyways 120 so that the assembly 122 may be placed in only one of two possible orientations in opening 118. Centered within the assembly 122 is a square optical wedge 134 so oriented that when key 124 is inserted into the keyway 120 at the upper side of the opening 118, the wedge's optical axis is preferably horizontal and the less dense portion of the wedge 134 lies to the left and its more dense portion lies to the right. Removing assembly 122 from the opening 118 and reinserting it so that key 124 fits into keyway 120 on the left side of the opening 118, then preferably causes the optical axis of the optical wedge 134 to lie vertically with the less dense portion of the wedge 134 lying inferiorly and the more dense portion lying superiorly. Both keyways 120 and key 124 itself are preferably marked with luminous material for ease of location in the darkness of the photographic darkroom. An opaque narrow line 126 is inscribed on the wedge 134 at the midpoint of its density range and perpendicular to the optical axis of the wedge.

Figure 5:
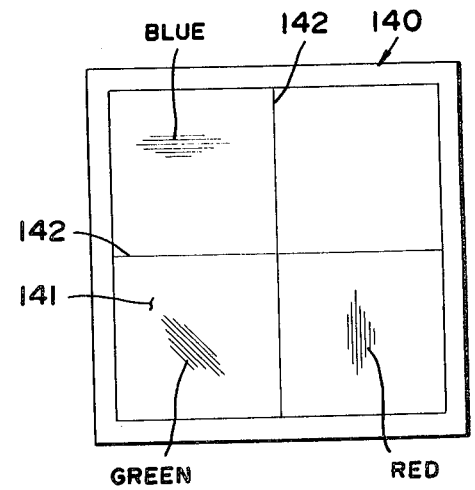
FIG. 5 is a plan view of a sample print made in accordance with the present invention.

FIG. 5 is a black and white representation of a color print prepared from a sample sheet of printing paper in accordance with the present invention. The print 140 comprises one composite test image 141. The composite test image 141 consists of the following superimposed exposures: a uniform exposure made preferably by red light of predetermined intensity for a predetermined time; a superimposed green light exposure of predetermined intensity for a predetermined time acting through the optical wedge 134 keyed to place its axis preferably horizontal with respect to the printing paper; and a superimposed blue light exposure of predetermined intensity and predetermined time acting through the optical wedge 134 keyed to place its axis preferably vertical with respect to the printing paper. The composite image 141 of the test print 140 bears two differently colored lines 142 at right angles to each other, intersecting at the center of the image 141.

When, as commonly will be the case, the predetermined exposures are programmed in the color analyzer 30 to give an approximation of neutral gray, the sample test print image 141 will show a continuous complex of variations from truly neutral gray. If neutral gray is found at the intersection of the two axes printed on the test sheet image 141, the trial color analyzer 30 program which controlled the test is, indeed, an accurate one for production printing! Unless done by design, this will rarely be the case. Instead, some other location on the image 141 will prove to be a small area of neutral gray. Physical measurement of the distance at which this area of neutral gray lies from the vertical axis or line 142, minus if to the right of the line and plus if to the left of the line, will be the measure of the amount in log exposure units by which the green trial program must be altered to bring the green exposure into color balance with the red exposure. Similarly, the distance of the neutral spot from the horizontal axis or line 142, minus if above the line and plus if below the line, will be the measure of the amount in log exposure units by which the trial blue program must be altered to bring the blue exposure into color balance with the red exposure.

An accessory, a paper gray scale, is preferably used to locate the neutral gray spot. The steps of the paper gray scale are typically 0.10 reflection density units apart, covering the range from 0.20 units to 1.20 density units. Each step contains a cleanly cut perforation about five millimeters in diameter. For example, such a paper gray scale is the Kodak Calibration Gray Scale disclosed in Kodak Publication No. Q-12B. The paper gray scale is placed over the test print in good illumination and while viewing the test print through the hole in the step which most closely approximates the density of the test image, a point of matching color neutrality of the gray of that step is sought in the test image 141. When such point is found a mark is made in the center of the viewing perforation on the test image 141. The shortest distance from this mark to both lines or axes is then found in millimeters. Some multiple of these measured distances, depending upon the gradient of the wedge in use, will determine the log exposure corrections to be applied. For example, with positive to positive materials, whose low contrast dictates the use of a steep gradient, perhaps 0.10 density per centimeter of length, the log exposure correction will be 0.01 units per millimeter of displacement from the axis involved. When the present invention is used for gray matching in negative to positive printing, the wedge should have a gradient distinctly less steep, perhaps 0.025 density units per centimeter of length. In such case each millimeter of neutral spot displacement from an axis would have a log exposure correction value of 0.0025 units. Those skilled in the art will have little difficulty in understanding that when one has an appropriately approximate color analyzer program and a thin sample of material to be matched in color, very close approximations in the print may be obtained for colors other than neutral gray.

A preferred method of practicing the present invention will now be described by way of an illustrative example. First it is necessary to prepare the enlarger 10 of FIG. 1 to permit the generation of separate exposures in predetermined amounts for each of the three primary colors of light. The enlarger 10 is set up so that the head 12 is sufficiently high to project onto the baseboard 18 a field of illumination having a diameter roughly three times the length of the optical wedge 134. The color analyzer 30 of FIG. 2 is programmed for sensitivity by setting the red, green, and blue attenuators 42, 44, and 46, and the neutral channel attenuator 48 to a reasonable combination of settings that previous practice has shown will be within striking distance for color balance and for overall density for the printing paper under test. Although the settings are realtively arbitrary, they should not be set so far apart as to exceed the range of possible correction as determined by the gradient of the optical wedge 134 shown in FIG. 4.

With the color analyzer 30 programmed, the probe 32 is placed on the baseboard 18 of the enlarger 10. A red filter of good quality optical gelatin such as a Kodak Wratten tricolor filter, is placed in the holder 24 beneath the lens 16. A film-neutralizing filter, which is a full-frame exposure of a neutral gray card made on the brand of film one is going to print from (such as Kodachrome 64) and mounted for convenience in a slide mount, is placed in holder 24 in the uppermost of the two filter positions it provides. This film-neutralizing filter will remain in place during all subsequent testing operations. Working in the dark so as to confine all meter readings to the mesurement only of light being emitted from the enlarger lens 16, the control 36 of the color analyzer probe 32 is switched to the red channel. The aperture (not shown) of the enlarger lens 16 is then varied until the meter 38 reads some arbitrarily selected value, and which may be come by in the following manner. The measured density of the clear margin of the wedge 134, 0.04 density units for example, is added to the midpoint density value of the optical wedge, which for the density to 0.80 density wedge of this particular embodiment is 0.40 density units. The sum, 0.44 density units, is taken as the red exposure zero point as indicated on meter 38 by the needle 40. Since the exposures through the green and blue filters will pass through the wedge 134, their zero points will be taken as 0 on the density scale of the meter 38. Next the red filter in the holder 24 is replaced by a suitable green filter and the control 36 of the color analyzer 30 is switched to the green channel. Without altering the aperture setting of the lens 16, the intensity of light emitted from lamp 14 is varied until the needle 40 falls on 0. Although there are a variety of means for varying the light intensity emitted from lamp 14, it is presently preferred that the lamp voltage be varied by a device such as the device 26 which is described in U.S. Pat. No. 3,392,626. The device 26 which is serially connected between the lamp 14 and a regulated voltage source (not shown) comprises three channels for selectively operating the lamp 14 at one of three different separately adjustable average voltage levels. With the lamp intensities of both the red and green exposures now set on the attenuators of this device 26, the device 26 is switched to its third channel, an appropriate blue filter is inserted in the holder 24 in place of the green filter, and the control 36 of the color analyzer 30 is switched to its blue channel. The voltage of the lamp 14 is then varied by the device 26, one again to bring the needle 40 to 0. At this stage, the programmed settings of the color analyzer 30 have been translated into voltage settings on the corresponding channels of the device 26, such that subsequent exposure may be made at predetermined light intensities corresponding to the programmed settings of the color analyzer 30.

If a device such as device 26 is not available for varying the light intensity of lamp 14 in the above-described manner, various alternative means can be used to achieve satisfactory results. For example, an automatic colorhead enlarger may be used selectively to vary the intensity of the primary colors of light. Available colorhead enlargers enable continuous color variations using dichroic filters. Another alternative which is less advantageous and hence less desirable for varying light intensity is the use of either color printing or color compensating filters in a known manner with a general purpose enlarger. The use of such discrete filters is less desirable because intensity variations can only be made in discontinuous steps. Whatever means for light intensity variation is used, however, it is only necessary that the predetermined value of light intensity be stable and reproducible in the darkroom. An additional factor which must be considered in using optical filtering means to control light intensity, which does not manifest itself when using the voltage control means of U.S. Pat. No. 3,392,626, is the problem of possible crossover existing between colors due to the inherent limitations of color filters. Such cross-over effects can be eliminated by repeating the above-described procedure for zeroing the color analyzer 30 until it can be switched between primary color channels without moving the needle 40 off the required zero points.

In addition to determining color balance, the present invention provides a convenient way for determining the overall responsiveness, or printing speed, of the printing paper being tested, so that an appropriate print density may be achieved. Accordingly, whichever color separation filter may still be found in the filter holder 24 under the enlarger lens 16 is now removed, leaving only the film-neutralizing filter in place. A feature of the present invention is that the judgment of print exposure is tied to the printing paper's responsiveness to red light. Therefore, the color analyzer 30, contrary to usual practice, is equipped with a red filter in its neutral channel. The probe 32 of the color analyzer 30 is switched to the neutral channel. The enlarger light intensity is set at the above-established value for red light using the same intensity control means as before. That is, if the voltage control means was used, the device 26 should be switched to its red channel. The aperture (not shown) of the enlarger lens 16 is then varied until the needle 40 of the meter 38 indicates an appropriate exposure time on the time of exposure scale. The color analyzer probe 32 is removed from the enlarger baseboard 18 in preparations for the next step of the procedure.

The preferred procedure for making the test print 140 of the FIG. 5 will now be described. The easel 110 of FIG. 3 is positioned on the enlarger baseboard 18 so that the optical wedge 134 lies in the middle of the projected field of illumination from the enlarger lens 16. Working now in complete darkness, a sample sheet of color printing paper is secured in place on the platen of the easel 110 using clips 112. The lightproof cover 114 is then closed. The assembly 122 is removed from the opening 118 in the easel cover 114. The red separation filter is placed in the filter holder 24 below the lens 16 and it should be confirmed that the device 26 is still switched to its red channel. If filtering was used to control light intensity, it should be confirmed that the predetermined filtering conditions have not been altered. The red exposure of the print is then made for the predetermined number of seconds.

The assembly 122 is replaced in the square opening 118 of the easel cover 114 so that the key 124 of the asembly 122 engages the keyway 120 at the top of the square opening 118. The red separation filter is replaced by the green separation filter in the filter holder 24 below the lens 16. The device 26 is switched to its green channel. Or, whatever other means for controlling light intensity is employed if device 26 is not being used and the green exposure is made for precisely the same time interval as done for the previous red exposure.

The last of the three exposures on the paper is achieved similarly using blue light. The assembly 122 is removed from the square opening 118 of the easel cover 114 and reinserted so that the key 124 of the assembly 122 engages the keyway 120 of the square opening 118 at its left side. The green separation filter is replaced by the blue separation filter in the filter holder 24. The means for controlling intensity of light is made operational with respect to the predetermined value for blue light, and then the blue light exposure is made for precisely the same time interval as the red and green exposures.

Upon development of the exposed sample sheet of printing paper, using standard laboratory processing procedures, the test image will appear as depicted in FIG. 5.

The steps involved in determining the responsiveness of the light-sensitive emulsion layers in the sample print 140 will now be described with particular reference to FIG. 5. The sample print 140 is laid on a flat, smooth surface and illuminated by a moderately strong light of similar quality to that by which production prints are normally viewed. The perforated paper gray scale is laid over the face of the composite print 141 and a step of the paper gray scale most closely resembling the composite test image 141 in overall density is selected. The selected step is manually moved around the composite test image 141 until a point is found at which the composite test image 141, as viewed through the perforation in the step of the paper gray scale, most closely resembles the color of the paper gray scale in neutrality or lack of color bias. The composite test image 141 is then marked, for example, by pricking by some sharp instrument, exactly in the center of the perforation and the paper gray scale is removed and put aside. As previously described, the distance of the mark to the vertical line or axis 142 is measured and it is noted whether the distance is plus or minus. This correction is noted as the green color analyzer program correction. The distance of the mark to the horizontal line or axis 142 is similary measured and it is noted whether the distance is plus or minus. This measurement is noted as the blue color analyzer program correction. The density of the step of the paper gray scale which most closely approximates the neutral density of the composite test image 141 is also noted under the exposure or neutral channel color analyzer program correction. If the neutral spot of the composite test image 141 seems to lie midway between two adjacent steps of the paper gray scale such interpolation should be noted.

Those skilled in the art will have little difficulty in realizing that color printing papers of different classes, such as positive to positive and negative to positive papers, are designed to have degrees of contrast which particularly suit them for printing from the appropriate transparencies or negatives, as the case may be. Therefore, from one lot to another, the same brand or kind of paper will have the same gamma (contrast) within small limits of variation. Such being the case, tables of exposure correction may be constructed for each kind of color printing paper which would allow the user to find the correct amount of log exposure correction for overall density based upon the value, interpolated or direct, of the density of the matching step(s) of the paper gray scale.

It has previously been stated that wedges of different density linear gradients may be provided to adapt the invention to different kinds of color printing or color matching, positive to positive or negative to positive, and that a factor would be used to multiply the millimetric displacements of the selected color spot on the composite test print 141 from the axes of the test print by to arrive at the correct log exposure corrections for the green and blue color analyzer programs. Accordingly, one examines the wedge of FIG. 4 to see what factor is marked on it, and then multiplies the millimeters of displacement by the indicated factor to arrive at the proper log exposure corrections. In the case of average positive to positive materials the factor is preferably 0.01 log exposure units for each millimeter.

A preferred procedure for using the color balance and speed corrections, obtained in accordance with the previously described steps, for printing color transparencies is now described. The color analyzer 30 is reprogrammed to take into account the color balance and speed corrections computed above. It is not necessary when doing this that the same separation filters and lamp intensities used in the testing procedure be used in the following reprogramming procedure. First, the preferred method elicits no color correction for the red exposure and, therefore, no change is made in the red program. The green adjustment is made by first positioning the aperture 34 of the color analyzer probe 32 in the field of illumination from the lamp 14 and lens 16 on the enlarger baseboard 18 with the probe control 36 switched to the green positon or channel. Then, working only in the light of the enlarger 10, the green adjustment is programmed into the color analyzer 30 in the following manner. The green attenuator 44 is adjusted to move the needle 40 on the density scale of the meter 38 by an amount corresponding to the amount of log exposure units of the green color balance correction factor, with the knowledge that optical density units on the meter scale have the same unitary value as log exposure units. The needle 40 is moved in the direction of increasing optical density if the green color balance correction factor is positive, or the needle 40 is moved in the direction of descreasing optical density if the green color balance correction factor is negative. In the event that such adjustment causes the needle 40 to move off scale, the initial position of the needle 40 can be reset in a position which will prevent this from occurring preferably by varying the aperture (not shown) of the lens 16, and then repeating the process of adjusting the setting of attenuator 44. When the analyzer has been successfully reprogrammed with the green adjustment the new setting of the green attenuator is noted and recorded.

The procedure for reprogramming the color analyzer 30 for the blue adjustment is identical to the procedure just described for the green adjustment. In particular, the control 36 is switched to the blue channel, and the blue attenuator 46 is adjusted to deflect the needle 40 by either a positive or negative number of optical density units corresponding to the blue color balance correction factor. The setting thus achieved for the blue attenuator 46 is noted and recorded.

The procedure for reprogramming the color analyzer 30 for the blue and green color balance corrections factors is followed exactly in reprogramming the color analyzer 30 for the overall exposure adjustment which has been ascertained from the table of exposure corrections. In particular, the control 36 is switched to the neutral channel and the neutral attenuator 48 is adjusted to deflect the needle 40 by either a positive or negative number of optical density units corresponding to the exposure correction factor. The setting thus achieved for the neutral attenuator 48 is noted and recorded.

Those skilled in the art will appreciate that the above-described invention enables the color balance of various lots of color printing paper to be compared objectively by making only one test from each lot. Once the color balance of a box of printing paper is known for a given brand of color transparency film, governed by the film-neutralizing filter used in making the test, any transparency of the same brank of film can be printed with a high degree of color excellence, provided only that the color balance of the film has been determined by any acceptable technique. This last statement means that if the same film-neutralizing filter used in making the test is also used in printing stock transparencies, the prints will have the same color balance as does the transparency being printed, within the capabilities of the paper to reproduce it. Should there be available a transparency of the standard gray card exposed under the same set of conditions and on the same roll of film as the transparencies being printed and should this transparency be used instead of the film-neutralizing filter to determine the light intensities of the enlarger lamp 14 for each of the three colored-light exposures, the resulting print can be more accurate in color balance than the transparency from which it is printed.

Although preferred embodiments have been described in detail, it is to be understood that various changes, substitutions and alterations will now suggest themselves to those skilled in the art. For example, it will be apparent that other primary light systems other than red-green-blue may be used in tri-color printing and that a primary color other than red may be selected as color of light to expose the test image uniformly (i.e. without assembly 122 in opening 118 of easel cover 114). It is to be understood that the present invention is not limited to the specific embodiments described, except as set forth in the appended claims.

I claim:

1. A method for ascertaining the color balance of color photographic printing paper of the type having superimposed light-sensitive emulsion layers, said method comprising the steps of:
   (a) forming a composite, superimposed image on a sample sheet of printing paper using one predetermined fixed exposure and first and second predetermined linearly varying log exposures of different colors of light, and
   (b) measuring the relative responsiveness of the emulsion layers using the displacements of a small area of preselected color on the sample sheet from a pair of axes assocated with said linearly varying log exposures.

2. The method of claim 1, wherein said axes are disposed at 90° C. to each other, are each orthogonal to the optical axis of its associated linearly varying log exposure, and demark lines of equal density along its associated linearly varying log exposure.

3. The method of claims 1 and 2, further including the step of forming lines on said sample sheet, which lines are coincident with said axes.

4. A method for ascertaining the color balance of color photographic printing paper of the type having three superimposed light-sensitive emulsion layers, each of which is selectively responsive to a different primary color of light, comprising the steps:
   (a) making three successive exposures of the same portion of a sample sheet of printing paper, one exposure being made directly on the paper and the other two being made through an optical wedge of linear density gradient, each of the three exposures consisting essentially of a different primary color of light of predetermined intensity and duration;
   (b) developing the sample sheet of printing paper to produce a composite image representing the combined response of the three emulsion layers; and
   (c) measuring the linear displacements of a selected area on the composite print corresponding to a neutral gray from a pair of axes.

5. The method of claim 4 wherein the step of making two exposures through the optical wedge of linearly varying density include the step of making these exposures at right angles to each other by rotating the wedge 90° between the two exposures.

6. The method of claim 5, further including the step of forming lines on said sample sheet, which lines are coincident with said axes.

7. The method of claim 4 further comprising the step of using the linear displacements to adjust relative exposures of the primary colors of light in subsequent photographic printing operations.

8. The method of claim 4, wherein the exposure made directly on the sample sheet is made with red light and wherein the two exposures made through the optical wedge are made with green and blue light, respectively.

9. An apparatus for making exposures of a selected portion of a sample sheet of photographic printing paper comprising:
- a single optical wedge of linear density gradient;
- means for selectively positioning the optical wedge over the paper in one of two possible orientations; and
- means for removing the wedge entirely from the paper whereby the paper when exposed with a light source used in combination with the apparatus forms a plurality of superimposed images, two of which are images of the optical wedge in its two possible orientations on the printing paper.

10. The apparatus of claim 9 wherein the positioning and removing means comprise:
- a frame including a cover having an opening therein;
- a platen disposed in the frame for holding the printing paper; and
- an assembly for holding said optical wedge and sized to be received in the opening in said cover, said cover including two keyways and said assembly having a matching key to engage one of said keyways when received in the opening to thereby ensure the proper orientation of the optical wedge with respect to the sample sheet of printing paper.

11. The apparatus of claim 9 wherein the optical wedge has a narrow opaque line transverse to its optical axis and passing through its midrange density.

12. The apparatus of claim 9 further including luminous markers associated with at least one of said key and said keyways.

* * * * *